Figure 2:
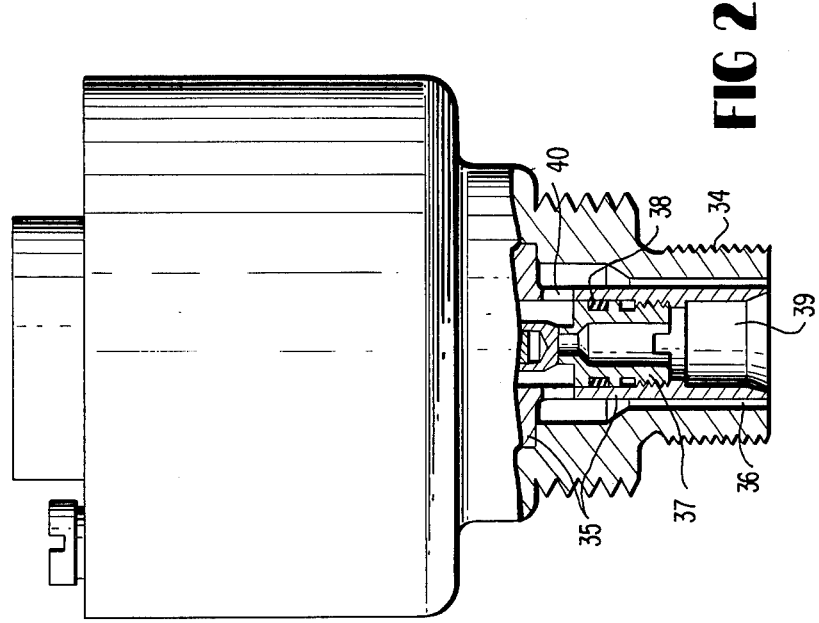

United States Patent [19]

von Koch

[11] 4,070,928
[45] Jan. 31, 1978

[54] CONTROL VALVE FOR THE WORKING PRESSURE OF AN AUTOMATIC CHANGE-SPEED GEAR

[75] Inventor: Arwed von Koch, Stuttgart, Germany

[73] Assignee: Daimler-Benz Aktiengesellschaft, Germany

[21] Appl. No.: 332,005

[22] Filed: Feb. 12, 1973

[30] Foreign Application Priority Data

Feb. 12, 1972 Germany .............................. 2206751

[51] Int. Cl.² ............................................ B60K 41/18
[52] U.S. Cl. .................................................... 74/863
[58] Field of Search ................................. 74/863, 864

[56] References Cited

U.S. PATENT DOCUMENTS

| 2,631,702 | 3/1953 | Prather | 74/863 |
| 2,938,403 | 5/1960 | Harrison et al. | 74/863 |
| 3,621,735 | 11/1971 | Lemieux | 90/11 R |
| 3,688,606 | 9/1972 | Lemieux et al. | 74/863 |

Primary Examiner—Samuel Scott
Assistant Examiner—Lance W. Chandler
Attorney, Agent, or Firm—Craig & Antonelli

[57] ABSTRACT

A control valve for the working pressure or for another pressure in an automatic transmission for vehicles, especially motor vehicles, in which a higher pressure fed in a throttled manner, possibly effective as pre-control pressure of a slide valve, is controlled in the manner of an excess pressure valve; the valve body of this control valve which is constructed as solenoid valve is acted upon by a control magnitude dependent on torque; the armature of the solenoid valve acts in the de-energized condition on the valve closure body with a predetermined force whereby this force is variable upon energization of the coil as a function of torque of the driving engine.

28 Claims, 2 Drawing Figures

CONTROL VALVE FOR THE WORKING PRESSURE OF AN AUTOMATIC CHANGE-SPEED GEAR

The present invention relates to a control valve for the working pressure or for another pressure in an automatically shifted transmission for vehicles, especially for motor vehicles, in which a pressure, fed in a throttled manner and possibly effective as pre-control pressure of a control slide valve, is controlled in the manner of an excess pressure valve or relief pressure valve whose valve body is acted upon by a magnitude dependent on torque.

In automatically shifting motor vehicle transmissions, the matching of the working pressure and under certain circumstances also of other pressures to the torque of the driving engine, especially, for example, of a Diesel engine is required. However, in that case the transmission of the influencing magnitude, for example, from the control rack of an injection pump or from other control devices is to take place as force-free as possible as otherwise the control itself might be influenced.

The present invention is concerned with the task to provide a solution to the described problem. The present invention solves the underlying problems with the arrangements described hereinabove in that this control valve is constructed as solenoid valve whose armature acts on the valve closure member in the de-energized condition with a predetermined force which upon energization is changeable in dependence on the torque of the driving engine.

The valve constructed according to the present invention offers the advantage that the transmission of the influencing magnitude, namely of the torque from the control member at the engine to the control valve can take place force-free. The pick-up of the influencing magnitude at the control device, for example, at the control rack of the injection pump can take place, for example, inductively whereby complete force freedom can be attained.

It is additionally proposed by the present invention that the energizing coil is arranged as annular coil on a tubularly shaped coil carrier member which axially at one end forms an annular gap by means of two pole shoes disposed concentrically about one another, into which gap the ring-shaped armature can be pulled in more or less. According to the present invention, the armature is thereby fixedly arranged at an end of a rod extending centrally through the coil carrier body, which carries at the opposite end an abutment for a spring. The fastening of the armature and of the abutment at the rod takes place rigidly, for example, by bonding or gluing so that a rigid armature system results. The spring thereby represents the force with which the armature acts upon the valve closure body and which is variable by the electromagnetic forces engaging at the armature upon energization of the coil.

In a preferred embodiment according to the present invention, the entire armature system consisting of armature, rod, abutment and possibly still other parts is held and centered in a freely suspended and frictionless manner in the valve housing and/or in the support body, and it is displaceable in the axial direction only against slight return forces. This means that the support and centering has to operate with slight return forces.

It is proposed therefor in detail according to the present invention that the armature system is held at both of its ends by a disk-shaped spring each having a low return force which is inserted radially yieldingly at the outer circumference in the housing. It is possible in this manner to keep the centering practically free of return forces and stresses or distortions also in case of temperature fluctuations. It is thereby proposed in detail that each disk spring is fixedly held at the outer circumference by means of at least one O-ring with respect to the housing or cover, on the one hand, and with respect to the coil carrier body, on the other.

A further feature of the present invention resides in that the ring body of the armature passes over at its end opposite the magnetic gap into a disk part which is secured inwardly on the rod by means of a pot-shaped central retaining part and in that the disk spring is placed over this retaining part and is held by wedging by means of a cap consisting of a non-magnetic material. Appropriately, the cap may form itself the valve closure body and the valve seat may also consist of a non-magnetic material. It can be achieved thereby that no forces occur between the valve seat and the valve closure body and a sticking of the valve closure body at the valve seat as well as a sticking of magnetic parts at the valve seat can be avoided with certainty.

Furthermore, according to the present invention, a pot-shaped central retaining part is secured on the end of the rod opposite the armature, over which is slipped the other disk spring and is clamped fast by the abutment of the spring. This means, in other words, the construction of the mounting of the armature system is in principle identical or at least similar on both sides by means of the two disk springs.

According to a further feature of the inventive concept, the abutments for the spring and valve seat are adjustably inserted into the housing or into a separate insert member, for example, are screwed into the same. An accurate adjustment and also an accurate setting of the spring force can take place as a result thereof, whence one end value of the pressure range to be controlled--in the instant case the upper limit value--can be readily changed and adjusted. In the instant case, the electromagnetic force acts against the spring force so that in case of failure of the electric current a high pressure is adjusted and damages in the transmission are avoided. In particular, according to the present invention, the spring abutment and the valve seat can be constructed as screw plugs whereby a tightly clamped in O-ring is arranged at the circumference thereof. The O-ring serves in an advantageous manner simultaneously as seal and as protection against rotation for the abument and the valve seat.

Accordingly, it is an object of the present invention to provide a control valve for the working pressure or other pressure of an automatically shifted transmission for vehicles which avoids by simple means the aforementioned shortcomings and drawbacks encountered in the prior art.

Another object of the present invention resides in a control valve for the working pressure or the like of an automatic change-speed transmission of motor vehicles which permits a proper matching of the working pressure to the torque of the driving engine.

A further object of the present invention resides in a control valve of the type described above which makes it possible to keep the transmission of the influencing magnitudes, for example, from the control rack of an injection pump as free of forces as possible in order to avoid an influencing of the control system itself.

A still further object of the present invention resides in a control valve for the working pressure of an automatic transmission in which the armature system of the magnetically operated control valve is adapted to be displaced axially against only very slight return forces.

Another object of the present invention resides in a control valve of the type described above which is extraordinary reliable in operation and prevents a sticking of valve parts.

Figure 1:
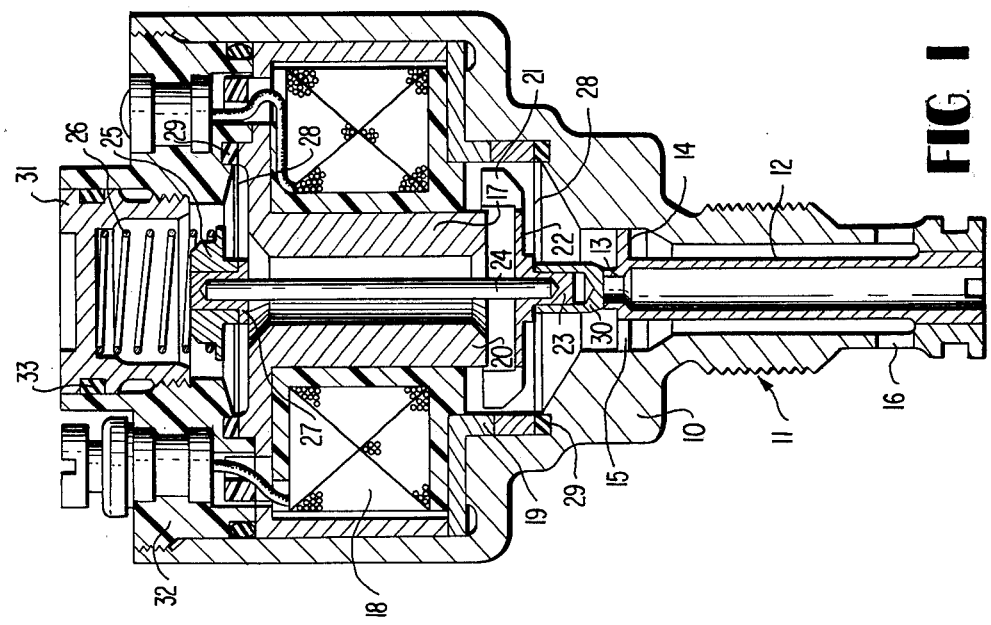

These and further objects, features and advantages of the present invention will become more apparent from the following description when taken in connection with the accompanying drawing which shows, for purposes of illustration only, two embodiments in accordance with the present invention, and wherein:

FIG. 1 is a longitudinal cross-sectional view through a first embodiment of a valve construction in accordance with the present invention; and FIG. 2 is a longitudinal cross-sectional view through a modified embodiment of a valve construction according to the present invention, illustrating the modified details thereof.

Referring now to the drawing wherein like reference numerals are used throughout the two views to designate like parts, and more particularly to FIG. 1, the housing 10 of the control valve is inserted with a relatively longer connecting stub generally designated by reference numeral 11 into the transmission housing (not shown). An insert member 12 is inserted into the connecting stub 11 which is constructed tubularly shaped; the pressure medium to be controlled flows through a throttling means (not shown) into the lower end of the tubularly shaped insert member 12. The insert member 12 consisting of non-magnetic material forms at the upper end thereof the valve seat 13. In order to assure an adequate guidance in the housing 10, a flanged portion 14 is arranged at the upper end of the insert member 12, by means of which the latter is supported in the housing 10. This flanged portion 14 is provided with apertures 15, for example, slots, through which the pressure medium can flow off pressureless toward the discharge openings 16.

The energizing winding or coil 18 of the solenoid valve is arranged on a tubularly shaped coil carrier body 17. The coil carrier body 17 forms at its end facing the valve seat a constant width magnetic gap by means of concentrically disposed annular portions 19 and 20, into which gap the armature 21 also constructed ring-shaped can be pulled in more or less. In the illustrated normal rest position, the armature 21 is disposed with the largest portion of its ring body outside this magnetic gap.

The armature itself includes a disk portion 22 at the ring body 21 on the side facing the valve seat 13, which is secured inwardly on a rod 24, for example, by gluing, by means of a pot-shaped central retaining portion 23, the rod 24 thereby extends centrally through the coil carrier body 17. At the other end of the rod 24 an abutment 25 for a spring 26 is secured on the rod 24 in a similar manner. Also, in this case a pot-shaped retaining portion 27 is rigidly secured on the rod 24. The armature is slotted for purposes of reducing the lateral forces.

Disk springs 28 are provided at the upper and lower end of the rod 24 for the guidance of the described armature system, which have only slight return forces in the axial direction. The disk springs 28 serve exclusively for the centering and mounting of the armature system in the housing. The disk springs 28 are so retained at their outer circumference with the aid of soft O-rings 29 that they can expand in the radial direction in case of temperature fluctuations. In this manner, the centering of the armature system remains preserved also in case of temperature fluctuations and remains free of radial distortion or warping stresses.

The valve closure body is constituted by a cap 30 consisting of nonmagnetic material which is slipped over the central retaining portion 23 and thereby holds fast simultaneously the disk springs 28 at its inner circumference. This arrangement takes place in an analogous manner on top at the abutment 25.

The spring 26 is supported at an abutment 31 serving as cover which is adjustably screwed into the housing by means of a thread. An O-ring 33 tightly clamped in between the abutment 31 and the housing cover 32 thereby serves as seal and simultaneously as means for preventing rotation.

The operation of the control valve can be readily seen from the figure. In the illustrated position, the energizing coil 18 is de-energized and the valve closure body, i.e., the cap 30 is caused to abut under the force of the spring 26 together with the entire armature system either completely at the valve seat 13 or is kept therefrom at a precisely predetermined slight distance. For an adjustment, also the valve seat 13 is adjustably screwed thereby in the connecting stub 11 of the housing 10 by means of a screw thread. In this position, the discharge pressure of the pressure medium is determined by the spring 26. With a more or less strong energization of the coil 18, the armature 21 is more or less pulled into the magnetic gap and therewith the entire armature system is displaced opposite the force of the spring 26 away from the valve seat 13. As a result thereof, the pressure changes in a customary manner upstream of the valve, which is then conditioned by the two forces acting at the armature system, i.e., the spring force less the magnetic force.

According to FIG. 2, the basic over-all construction of the control valve and especially of the armature system is exactly the same as described hereinabove in connection with FIG. 1. However, in this embodiment, the housing 10 has only a short connecting stub 34 into which is inserted an insert member 35 which, together with the stub 34, forms an annular gap 36. The valve seat 37 is adjustably screwed into the inner bore of this insert member 35 and is secured against rotation in the manner described already hereinabove by means of a tightly clamped O-ring 38. The O-ring 38 thereby serves--exactly as in the arrangement according to FIG. 1--simultaneously also as seal at the abutment 31.

The medium to be controlled again flows through the central aperture 39 and after passage of the more or less open valve flows off through the cross bores 40 in the insert member 35 in the annular gap 36. As to the rest, the operation of this valve is exactly the same as already described in connection with FIG. 1.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A control valve arrangement for controlling the pressure of a pressure medium in an automatic transmission for vehicles having a driving engine, the arrangement comprising: control valve means constructed as a solenoid valve means including a ring-shaped armature means, a valve closure body means, said ring-shaped armature means being operatively connected with said valve closure body means and applying a predetermined force on said valve closure body means in a de-energized condition of the solenoid valve means a constant width annular magnetic gap means for accommodating said ring-shaped armature means upon an energization of the solenoid valve means, and means for energizing said solenoid valve means in dependence upon the torque of the driving engine such that said ring-shaped armature means is drawn into said constant width annular magnetic gap means by a predetermined amount so as to change the predetermined force acting upon said valve closure body means to that the pressure of the pressure medium is correlated with the torque of the driving engine.

2. A control valve for controlling the pressure of a pressure medium in an automatic transmission for vehicles, in which a higher pressure fed in a throttled manner is controlled in the manner of an excess pressure valve whose valve body is acted upon by a control magnitude dependent on torque, characterized in that the control valve is constructed as solenoid valve which includes a ring-shaped armature means, a valve closure body means acted upon by the ring-shaped armature means with a predetermined force in a de-energized condition of the solenoid valve, a constant width annular magnetic gap means for accommodating said ring-shaped armature means upon an energization of the solenoid valve, and means for energizing the solenoid valve in dependence of the torque of the driving engine such that said ring-shaped armature means is drawn into said constant width annular magnetic gap means by a predetermined amount so as to change the predetermined force acting upon said valve closure body means so that the pressure of the pressure medium is correlated with the torque of the driving engine.

3. A control valve according to claim 2, characterized in that the pressure is the working pressure of the automatically shifting transmission.

4. A control valve according to claim 2, characterized in that the higher pressure acts as precontrol pressure of a control slide valve.

5. A control valve arrangement for controlling the pressure of a pressure medium in an automatic transmission for vehicles having a driving engine, the arrangement comprising: control valve means constructed as a solenoid valve means including an armature means and a valve closure body means, said armature means being operatively connected with said valve closure body means and applying a predetermined force on said valve closure body means in the de-energized condition of the solenoid valve means, and means for changing said force upon energization of said solenoid valve means in dependence upon the torque of the driving engine, said solenoid valve means further includes an energizing coil constructed as a ring coil, a tubularly shaped coil carrier body means for carrying said ring coil, said coil carrier body means forming axially at one end thereof an annular magnetic gap by means of two pole shoe means disposed concentrically about one another, said armature means being adapted to be pulled more or less into said annular gap.

6. A control valve arrangement according to claim 5 wherein a rod extending centrally through the coil carrier body means is provided, said armature means being fixedly mounted at one end of said rod and wherein a spring and abutment means for said spring are provided, said abutment means being disposed on the opposite end of said rod.

7. A control valve arrangement with a valve housing means according to claim 6, wherein said armature means, said rod, and said abutment means are retained and centered in a suspended and frictionless manner in at least one of the two parts consisting of a valve housing means and said coil carrier body means, and wherein said armature means, said rod, and said abutment means are axially displaceable against only slight return forces.

8. A control valve arrangement according to claim 7, wherein said armature means, said rod, and said abutment means are retained and centered in a suspended and frictionless manner in both said valve housing means and said coil carrier body means.

9. A control valve arrangement for controlling the pressure of a pressure medium in an automatic transmission for vehicles having a driving engine, the pressure medium being fed in a throttled manner and being controlled in the manner of an excess pressure valve, the pressure valve having a valve body acted upon by a control magnitude dependent on the torque of the driving engine, the arrangement comprising: a valve housing means, control valve means disposed in said valve housing means and constructed as a solenoid valve means including an armature means and a valve closure body means, said armature means being operatively connected with said valve closure body means and applying a predetermined force on said valve closure body means in the de-energized condition of the solenoid valve means and wherein means are provided for changing said force upon energization of said solenoid valve means in dependence upon the torque of the driving engine, said solenoid valve means further including an energizing coil constructed as a ring coil, a tubular shaped coil body means for carrying said ring coil, said coil carrier body means forming axially at one end thereof an annular magnetic gap by means of two pole shoe means disposed concentrically about one another, said armature means being adapted to be pulled more or less into said annular gap, a rod extending centrally through the coil carrier body means, said armature means being fixedly mounted at one end of said rod, a spring and abutment means for said spring, said abutment means being disposed on the opposite end of said rod, said armature means, said rod, and said abutment means being retained and centered in a suspended and frictionless manner in at least one of the two parts consisting of the valve housing means and said coil carrier body means, said armature means, said rod and said abutment means being axially displaceable against only slight return forces, said armature means, said rod and said abutment means being retained at both ends by a disc-shaped spring having a low return force which is radially yieldingly inserted at the outer circumference thereof in a respective one of the valve housing means and said coil carrier body means.

10. A control valve arrangement according to claim 9, wherein each disk spring is held fast at the outer circumference by means of at least one O-ring disposed between the valve housing means and said coil carrier body means.

11. A control valve arrangement according to claim 10, wherein the valve housing means includes a cover means, one of said disk-shaped springs being held fast by a corresponding O-ring disposed between said cover means and said coil carrier body means.

12. A control valve arrangement according to claim 10, wherein said armature means includes an annular body portion which passes over at its end opposite said magnetic gap into a disk portion, said disk portion being secured inwardly by means of a pot-shaped central retaining portion provided on said rod, and wherein one of said disk-shaped springs is slipped over said retaining portion and held fast by a cap means consisting of non-magnetic material.

13. A control valve arrangement according to claim 12, wherein said cap means forms itself said valve closure body means and wherein said control valve means further includes valve seat means of non-magnetic material.

14. A control valve arrangement according to claim 12, wherein a further pot-shaped central retaining portion is secured on the end of said rod opposite said armature means, over which is slipped the corresponding disk-shaped spring and is held fast by said spring abutment means.

15. A control valve arrangement according to claim 14, wherein a further abutment means for the spring is provided, said solenoid valve means further includes a valve seat means, and wherein said further abutment means and said valve seat means are adjustably inserted into the valve housing means.

16. A control valve arrangement according to claim 15, wherein said further abutment means for the spring and said valve seat means are adjustably screwed into the valve housing means.

17. A control valve arrangement according to claim 14, wherein said further abutment means for the spring and said valve seat means are adjustably screwed into a separate insert member.

18. A control valve arrangement according to claim 15, wherein said further spring abutment means and said valve seat means are constructed as threaded plugs and wherein a tightly stressed O-ring is arranged at their circumference and serves simultaneously as seal and as means for protecting against rotation.

19. A control valve arrangement according to claim 12, wherein a further pot-shaped central retaining portion is secured on the end of said rod opposite said armature means, over which is slipped the corresponding disk-shaped spring and is held fast by said spring abutment means.

20. A control valve arrangement for controlling the pressure of a pressure medium in an automatic transmission for vehicles having a driving engine, the arrangement comprising: control valve means constructed as a solenoid valve means including a coil carrier body means, an armature means and a valve closure body means, said armature means being operatively connected with said valve closure body means and applying a predetermined force on said valve closure body means in a deenergized condition of the solenoid valve means, means for changing said predetermined force upon an energization of said solenoid valve means in dependence upon the torque of the driving engine, a rod extends centrally through the coil carrier body means, said armature means being fixedly mounted at one end of said rod, and a spring and abutment means for said spring are provided, said abutment means being disposed on an opposite end of said rod.

21. A control valve arrangement with a valve housing means according to claim 20, wherein said armature means, said rod, and said abutment means are retained and centered in a suspended and frictionless manner in at least one of the two parts consisting of the valve housing means and said coil carrier body means, and wherein said armature means, said rod, and said abutment means are axially displaceable against only slight return forces.

22. A control valve arrangement according to claim 20, wherein a further abutment means for said spring is provided, said solenoid valve means further includes a valve seat means, and wherein said further abutment means and said valve seat means are inserted adjustably into a valve housing means.

23. A control valve arrangement according to claim 22, wherein said further abutment means for said spring and said valve seat means are adjustably screwed into a separate insert member.

24. A control valve arrangement according to claim 22, wherein said further spring abutment means and said valve seat means are constructed as threaded plugs, and wherein a tightly stressed O-ring is arranged at their circumference and serves simultaneously as a seal and as a means for protecting against rotation.

25. A control valve arrangement for controlling the pressure of a pressure medium in an automatic transmission for vehicles having a driving engine, the pressure medium being fed in a throttled manner and controlled in the manner of an excess pressure valve, the pressure valve having a valve body acted upon by a control magnitude dependent on the torque of the driving engine, the arrangement comprising: valve housing means, a control valve means disposed in said valve housing means, said control valve means being constructed as a solenoid valve means including an energizing coil, a coil carrier body means for carrying said energizing coil, an armature means, and a valve closure body means, said armature means being operatively connected with said valve closure body means and applying a predetermined force on said valve closure body means in the de-energized condition of the solenoid valve means, and wherein means are provided for changing said force upon energization of said solenoid valve means in dependence upon the torque of the driving engine, a rod extending centrally through said coil carrier body means, said armature means being fixedly mounted at one end of said rod, a spring and abutment means for said spring being disposed on the opposite end of said rod, said armature means, said rod, and said abutment means being retained and centered in a suspended and frictionless manner in at least one of the two parts consisting of the valve housing means and said coil carrier body means, said armature means, said rod and said abutment means being axially displaceable against only slight return forces, said armature means, said rod and said abutment means being retained at both ends by a disk-shaped spring having a low return force which is radially yieldingly inserted at the outer circumference thereof in a respective one of the valve housing and said coil carrier body means.

26. A control valve arrangement according to claim 25, wherein each disk spring is held fast at the outer circumference by means of at leat one O-ring disposed between the valve housing means, and said coil carrier body means.

27. A control valve arrangement according to claim 25, said coil carrier body means forms axially at one end thereof an annular magnetic gap, said armature means being adapted to be pulled more or less into said annular gap, said armature means including an annular body portion which passes over at its end opposite said magnetic gap into a disk portion, said disk portion being secured inwardly by means of a pot-shaped central retaining portion provided on said rod, and wherein one of said disk-shaped springs is slipped over said retaining portion and is held fast by a cap means consisting of non-magnetic material.

28. A control valve arrangement according to claim 27, wherein said cap means forms itself said valve closure body means and wherein said control valve means further includes valve seat means of non-magnetic material.

* * * * *